US009633133B2

(12) United States Patent
Wu

(10) Patent No.: US 9,633,133 B2
(45) Date of Patent: Apr. 25, 2017

(54) WEB SERVER FOR MULTI-VERSION WEB DOCUMENTS

(75) Inventor: Zhe Wu, Nashua, NH (US)

(73) Assignee: Oracle International Corporation, Redwood Shores, CA (US)

(*) Notice: Subject to any disclaimer, the term of this patent is extended or adjusted under 35 U.S.C. 154(b) by 34 days.

(21) Appl. No.: 12/723,727

(22) Filed: Mar. 15, 2010

(65) Prior Publication Data
US 2010/0223260 A1 Sep. 2, 2010

Related U.S. Application Data

(62) Division of application No. 10/839,938, filed on May 6, 2004, now Pat. No. 7,689,601.

(51) Int. Cl.
G06F 17/30 (2006.01)

(52) U.S. Cl.
CPC .... G06F 17/30902 (2013.01); G06F 17/3089 (2013.01); Y10S 707/99955 (2013.01)

(58) Field of Classification Search
None
See application file for complete search history.

(56) References Cited

U.S. PATENT DOCUMENTS

| 5,909,677 | A | 6/1999 | Broder et al. |
| 6,012,087 | A | 1/2000 | Freivald et al. |
| 6,185,614 | B1* | 2/2001 | Cuomo et al. ............... 709/224 |
| 6,349,296 | B1 | 2/2002 | Broder et al. |
| 6,397,205 | B1* | 5/2002 | Juola ..................... 707/999.002 |
| 6,405,223 | B1 | 6/2002 | Kelley et al. |
| 6,625,624 | B1* | 9/2003 | Chen et al. |
| 6,678,705 | B1 | 1/2004 | Berchtold et al. |
| 6,941,511 | B1* | 9/2005 | Hind et al. ................. 715/235 |
| 7,627,613 | B1* | 12/2009 | Dulitz et al. ........... 707/999.001 |
| 2002/0010682 | A1 | 1/2002 | Johnson |

(Continued)

FOREIGN PATENT DOCUMENTS

| EP | 1006466 | 6/2000 |
| EP | 1006466 A2 | 6/2000 |
| WO | WO2005109251 | 11/2005 |

OTHER PUBLICATIONS

Heintze, "Scalable Document Fingerprinting," 1995.*

(Continued)

Primary Examiner — Jau-Shya Meng
(74) Attorney, Agent, or Firm — Vista IP Law Group, LLP

(57) ABSTRACT

A repository server that provides stored copies of Web-accessible documents A client of the repository server may register a document in the repository server. The repository server makes a copy of the registered document and returns a repository URL for the copy to the client. The repository URL may be used to fetch the copy from the repository URL. Registration further relates the stored copy to its document URL, to an identifier for the stored copy, to a fingerprint that is a condensed representation of the stored copy's content and can be used to determine degrees of similarity other than match-no match, and to a set of stored copies having similar content. The fingerprints are used to compute similarity. The similarity computation further employs comparisons of links in the documents and of document URLS to determine whether it is necessary to use the fingerprints to compute similarity.

24 Claims, 11 Drawing Sheets

(56) References Cited

U.S. PATENT DOCUMENTS

| | | | |
|---|---|---|---|
| 2002/0049760 | A1 | 4/2002 | Scott et al. |
| 2002/0099697 | A1* | 7/2002 | Jensen-Grey .................... 707/3 |
| 2002/0156800 | A1 | 10/2002 | Ong |
| 2003/0101234 | A1 | 5/2003 | McBrearty et al. |
| 2003/0172066 | A1* | 9/2003 | Cooper et al. .................... 707/7 |
| 2003/0182295 | A1* | 9/2003 | Ukai et al. .................... 707/100 |
| 2004/0015523 | A1 | 1/2004 | Guest et al. |
| 2004/0098405 | A1* | 5/2004 | Zrubek .............. G06F 17/3061 |
| 2005/0004943 | A1* | 1/2005 | Chang .............. G06F 17/30867 |
| 2005/0060643 | A1* | 3/2005 | Glass et al. ................ 715/501.1 |

OTHER PUBLICATIONS

Phelps et al., "Robust Hyperlinks Cost Just Five Words Each", University of California, Berkeley, 2000.

"Microsoft Computer Dictionary, Fifth Edition" Microsoft Press, 2002.

Herman Chung-Hwa Rao et al., "A Proxy-Based Web Archiving Service", Operating Systems Review ACM USA, Jan. 2001, pp. 61-72, vol. 35, No. 1.

Jun Hirai et al., "WebBase: a repository of web pages", Computer Networks, Elesvier Science Publishers BV Amsterdam, NL. vol. 33, No. 1-6, Jun. 2000.

International Search Report in PCT/US2005/015700.

About the Internet Archive as found on Sep. 9, 2004 at http://www.archive.org/about.php?PHPSESSID=3d38f89831c5d8826cd19216f13b19dc (pp. 14).

Herman Chung-Hwa Rao and Yih-Farn Chen, "A Proxy-Based Personal Web Archiving Service," Operating Systems Review ACM USA, vol. 35, No. 1, Jan. 2001.

Jun Hirai, Sriram Raghavan, Hector Garcia-Molina, Andreas Paepcke, "WebBase: a repository of Web pages," Computer Networks, Elesvier Science Publishers by Amsterdam, NL, vol. 33, No. 1-6, Jun. 2000.

"About the Internet Archive" as found on Sep. 9, 2004 at http://www.archive.org/about.php?PHPSESSID=3d38f89831c5d8826cd19216f3b19dc (pp. 14).

Phelps et al., "Robust Hyperlinks Cost Just Five Words Each," University of California, Berkeley, 2000.

"Microsoft Computer Dictionary, Fifth Edition," Microsoft Press, 2002.

PCT International Search Report and Written Opinion for PCT/US2005/015700, Applicant Oracle International Corporation, Forms PCT/ISA/220, 210, and 237, dated Apr. 5, 2005 (9 pages).

Notice of Allowance for Canadian Patent Appln. No. 2,565,777 dated Sep. 5, 2012.

Office Action for Chinese Patent Appln. No. 201010125092.8 dated May 18, 2011.

Office Action for Chinese Patent Appln. No. 201010125092.8 dated May 18, 2012.

Office Action for Chinese Patent Appln. No. 200580022517.X dated May 30, 2008.

Office Action for Chinese Patent Appln. No. 200580022517.X dated Jun. 19, 2009.

Examiner's First Report for Australian Patent Appln. No. 2005241535, dated Feb. 18, 2010.

Patent Examination Report No. 1 dated Oct. 19, 2012 for related AU Patent Application No. 2010227101, 3 pages.

Patent Examination Report No. 2 dated May 12, 2014, for related AU Patent Application No. 2010227101, 3 pages.

Patent Examination Report No. 3 dated Jul. 17, 2014, for related AU Patent Application No. 2010227101, 3 pages.

Notification to Grant Patent Right for Invention dated Dec. 24, 2012, for related CN Patent Application No. 201010125092.8, 2 pages.

First Office Action dated Feb. 9, 2012, for related CA Patent Application No. 2,565,777, 4 pages.

First Examination Report dated Oct. 12, 2015 for related IN Patent Application No. 414/KOL/2010, 1 page.

First Office Action for Japanese Patent No. 4785838, mailed on Jan. 25, 2011 (3 pages).

* cited by examiner

| HTML start tag | Encoded start tag | HTML end tag | Encoded end tag |
|---|---|---|---|
| <HTML> | <j | </HTML> | j> |
| <BODY> | <5 | </BODY> | 5> |
| any other start tag | <X | any other end tag | X> |
| <P> | <v | </P> | v> |

803

HTML encodings 801

```
807 fingerprint    := ""; // empty string to begin with
    while (html-parsing-not-over)
    do
       if (hit-html-start-tag) then
811       fingerprint := fingerprint + map(starting-tag-name);
       end if;

if (hit-html-ending-tag) then
813       fingerprint := fingerprint + map(ending-tag-name);
       end if;
809
       if (hit-html-text) then
          fingerprint := fingerprint + firstTwoChars(text) +
815          toChar(length(text)% 58 + 64);
          // Other alternatives like MD5, hashing are omitted here
       end if;
    end while;

817 return fingerprint; // the final finger print
```

605

821 ⟨ 823 ⟨ 825
<j<5<XheF'X><vTon'v'>'5>'j>
fingerprint 819

Fig.8

```
// Assume two fingerprints are passed in
// fp1 and fp2 (assume fp1 is not longer than fp2)
lastPos    := 1;
delimPos   := locateSubString(fp1, '<', lastPos);
similarity := 0;

while (delimPos > 0)
do
  matchLen := length(longestSubStr(fp1, fp2, delimPos));
  if (matchLen >= 6) then
     similarity := similarity + matchLen;
  end if;
  lastPos    := delimPos + max(matchLen, 1);
  // Advance to the next starting point.
  delimPos := locateSubString(fp1, '<', lastPos);
end while;

// Get the percentage
return similarity / length(fp1);
```

Fig. 9

```
Step 1:
// Assume we have two numbers:
// linkNum1 for number of reference links (URLs) for the
              requested page
//
// linkNum2 for number of reference links (URLs) for a page
//     (Call it candidate page) in the system's repository
```

The candidate page will pass the filtering *only if*:

$$(linkNum1 + linkNum2 <= 7) \quad \text{1003}$$

$$\text{or} \quad \frac{|\, linkNum1 - linkNum2\, |}{(\, linkNum1 + 2 + linkNum2\, )} < 0.3333 \quad \text{1005}$$

1001

```
Step 2:
// Assume we have two numbers:
// totalLinksNum: the number of reference links (URLs) for
                  the requested page
//
// sameLinksNum: the number of the same links (URLs) for
                  both pages
```

The candidate page will pass the filtering *only if*:

$$\frac{sameLinksNum + 3 \;\text{1011}}{totalLinksNum + 3 \;\text{1013}} > 0.45 \quad \text{1015}$$

WEB SERVER FOR MULTI-VERSION WEB DOCUMENTS

CROSS-REFERENCE TO RELATED APPLICATIONS

The present patent application is a divisional of U.S. Ser. No. 10/839,938, Zhe Wu, Archiving Web documents using unique document locators, filed 6 May 2004, which will issue 30 Mar. 2010 as U.S. Pat. No. 7,689,601. The claims of the present application are directed to the subject matter of claims 62-77 of U.S. Ser. No. 10/839,938 as filed. Those claims were canceled in response to a restriction requirement made Dec. 22, 2006. The entire Specification and Figures of U.S. Pat. No. 7,689,601 are hereby incorporated by reference for all purposes into the present patent application.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The invention is generally related to the Internet and more specifically related to the problem of accessing and tracking content that is accessible via the Internet.

2. Description of Related Art

The Internet, and in particular, the World Wide Web that is made possible by the Internet's HTTP protocol, have revolutionized the way in which we access information. FIG. 1 shows how the information access system 101 provided by World Wide Web 123 looks to a user of a computer 127 that has a Web browser and a hard drive 129 for persistent storage of data. Such a system is termed a web client 125. In addition to web clients 125, system 101 contains Web servers 111 that are accessible via world wide web 123. As shown in detail with regard to Web server 111(a), a Web server includes a processor 113(a) and data storage 119(a) which contains documents 121 which are accessible via the Web. These documents are termed in the following Web documents. A web document 121 may contain any kind or mixture of kinds of information; it may for example be an image or an audio file as well as a text document.

To access a document on the World Wide Web, a user of a Web browser in client 125 provides a URL (uniform resource locator) for the Web document to Web 123. Web 123 routes the URL to a web server 111(i) that contains the Web document specified by the URL. Web server 111(i) responds to the URL by providing the specified Web document via the Web to Web client 125. The browser then displays the Web document. Web documents typically contain links, i.e., URLs to other Web documents. When a user selects one of these links by clicking on it, the browser provides the URL to Web 123 and that Web document is provided to the web client by the Web server in which the Web document resides as just described.

An example URL is shown at 123. A URL has three main components: protocol 105, which specifies the Internet protocol that will be used to retrieve the Web document, in this case, the http protocol which is used in the World Wide Web, host name 107, which specifies Web server 111(i) upon which the Web document is stored, and Web page source info 109, which specifies how the Web document is to be located or otherwise produced in Web server 111(i). In example URL 103, Web page source info 109 is a pathname which indicates how the Web document is to be located in a file system accessible to Web server 111(i); in other URLs, Web page source info 109 may specify a program that queries a database to locate the Web document or even a program that constructs all or part of the Web document on the fly. Web page source info 109 is interpreted in Web server 111(a) by executing source info interpretation code 117(a).

The complete syntax for a URL is the following:

<protocol_name>://<host_name>:<port_no>/<pathname>?
<parameter_list>

The <protocol_name>, <host_name>, and <pathname> have already been explained; <port_no> specifies the port on which Web server 111(a) is listening for the information specified by Web page source info 109; application programs for widely-used protocols such as the HTTP protocol have default port numbers which client 125 supplies for the protocol if no port number is specified in the URL. <parameter_list> is a list of parameters which are interpreted by source info interpretation code 117; the parameters may specify a program to be executed and data parameters for the program. The parameter list is made up of one or more parameter name-parameter value pairs that are separated by a & character:

<parameter_name>=<parameter_val>&...
&<parameter_name>=<parameter_val>

Whenever a Web client 125 is connected to a physical network that provides access to World Wide Web 123, Web client 125 can access any Web server 111 that is operative at that time. Since most Web servers operate continually, most information that is available via the World Wide Web is available at any time from anywhere. Because that is so, Web users tend not to make copies of information that they have retrieved in Web client 125; instead, they save the URL of the Web document that contains the information in a list 131 of interesting URLs. One example of such a list is the "Favorites" or "Bookmarks" list provided by most Web browsers. When the user wants to access the information again, the user simply clicks on the URL in the Favorites list and thereby provides the URL to the browser.

Saving URLs instead of the Web documents they refer to has both advantages and disadvantages. Both stem from the dynamic nature of the World Wide Web. A URL is not a kind of library card catalog number for a Web document. A library card catalog number for a book uniquely identifies a particular edition of a book. If a new edition of the book comes out, it receives a new library card catalog number. The new card catalog number will be similar to the number for the other edition, since both editions will be classified in the same manner, but it will not be identical to the number for the other edition. Because each edition has its own library card catalog number, a reader who writes down the card catalog number for a particular edition and ten years later presents the number to a library that has that edition will receive the edition.

A URL, by contrast, only identifies a Web server 111(*i*) and a Web document which the server will return in response to the Web page source info. There is no guarantee that the server specified by the URL will be available or even still exists, or that the Web document that the server will return is the same as the one that was there when the client saved the URL. What is actually returned is completely up to the server. The advantage of this arrangement is that what the server generally returns is the most recent version of the Web document. With many Web documents, for example, those which contain weather reports or stock market prices, that is exactly what is desired. The disadvantage is that older versions of the Web document are no longer accessible by the URL and may not be accessible at all. It is further generally not clear what relationship the currently-accessible Web document has to the older versions. One area where this causes difficulty is documentation for software. Increasingly, the manufacturer of the software provides such documentation by the World Wide Web; if the URL for the documentation specifies the current version of the software, a user who has an older version may be left with no documentation at all. About the only way the user of a Web browser 127 has to deal with this problem is to save a local copy of the documentation in his Web client. In so doing, of course, the user loses one of the most important advantages of the Web: the ability to save URLs instead of copies.

One attempt that has been made to deal with this problem is to establish Web archiving services such as the one found at www.archive.org. Such services have all of the problems of general-purpose archives: they are huge, but often do not have what the individual needs, and individuals typically have little or no input into what the archive saves. Additionally, vast amounts of the information which is accessible by a Web client is not publicly available and therefore will not be archived by an archiving service. This situation occurs when the Web server is behind a firewall which separates the public Internet from a so-called intranet which employs the Internet but is accessible only to Web clients known to the organization to which the intranet belongs. The server is thus accessible by Web clients that are also behind the firewall or that are known to the firewall, but not to Web clients in general. Such intranets are now one of the preferred ways of communicating within organizations.

It is an object of the invention disclosed herein to provide techniques for overcoming the foregoing problems of accessing documents by means of their URLs.

BRIEF SUMMARY OF THE INVENTION

The object of the invention is attained by means of a repository server which fetches a document specified by a document URL, stores a copy of the document in the repository server, and provides a repository server URL for the stored copy which can be used by a Web client to fetch the stored copy. The repository server relates the stored copy to the document URL for the document and to an identifier in the repository server for the stored copy. The repository server may thus contain stored copies for several versions of a document represented by a particular document URL, with a unique repository server URL for each stored copy. The repository further creates a fingerprint for the stored copy. The fingerprint is a small encoded version of the stored copy which preserves information that characterizes both the structure and the content of the stored copy. Fingerprints are comparable to determine a degree of similarity of a pair of documents. Each stored copy's fingerprint is associated with the stored copy in the repository and the repository further associates a list of other stored copies that are similar to a given stored copy with the given stored copy.

A user interface consisting of pages provided to a client of the repository server permits a user of the client to register a document by specifying that operation and providing the document URL for the document. The repository server responds by making the stored copy, making the stored copy's repository URL, relating the stored copy to the document URL and the identifier for the stored copy, making the stored copy's fingerprint, and making the stored copy's list of similar stored copies.

The user interface further permits the user to fetch a document's content by specifying that operation and inputting the stored copy's repository URL to the repository server. The repository server responds to the repository URL by first using the document URL associated with the stored copy to determine whether the document is accessible in the network; if it is the client is redirected to the location specified by the document URL; if the document is not accessible, the stored copy specified by the repository URL is returned.

Additionally, the user interface permits the user to track stored copies of a document. The user specifies a repository URL and the operation in the client and the repository server responds by providing a list of repository URLs for stored copies that have the same document URL as the document URL related to the copy specified by the repository URL. In one embodiment of this operation, the repository server also responds by providing a list of repository URLs for stored copies that are similar to the stored copy specified by the repository URL. Selection of a repository URL from either list causes the repository server to respond by providing the stored copy specified by the repository URL to the client.

In other aspects, the invention concerns techniques for making and comparing fingerprints, including techniques for determining whether two stored copies are similar enough to warrant a comparison of fingerprints, techniques for making the repository URL, and techniques for rewriting and using links in stored copies.

Other objects and advantages will be apparent to those skilled in the arts to which the invention pertains upon perusal of the following Detailed Description and drawing, wherein:

BRIEF DESCRIPTION OF THE SEVERAL VIEWS OF THE DRAWINGS

FIG. 8 shows an algorithm for making fingerprints;

FIG. 9 shows an algorithm for determining the similarity of documents by comparing the fingerprints from which they were made;

FIG. 10 shows an algorithm for filtering documents for dissimilarity; and

Figure 1:
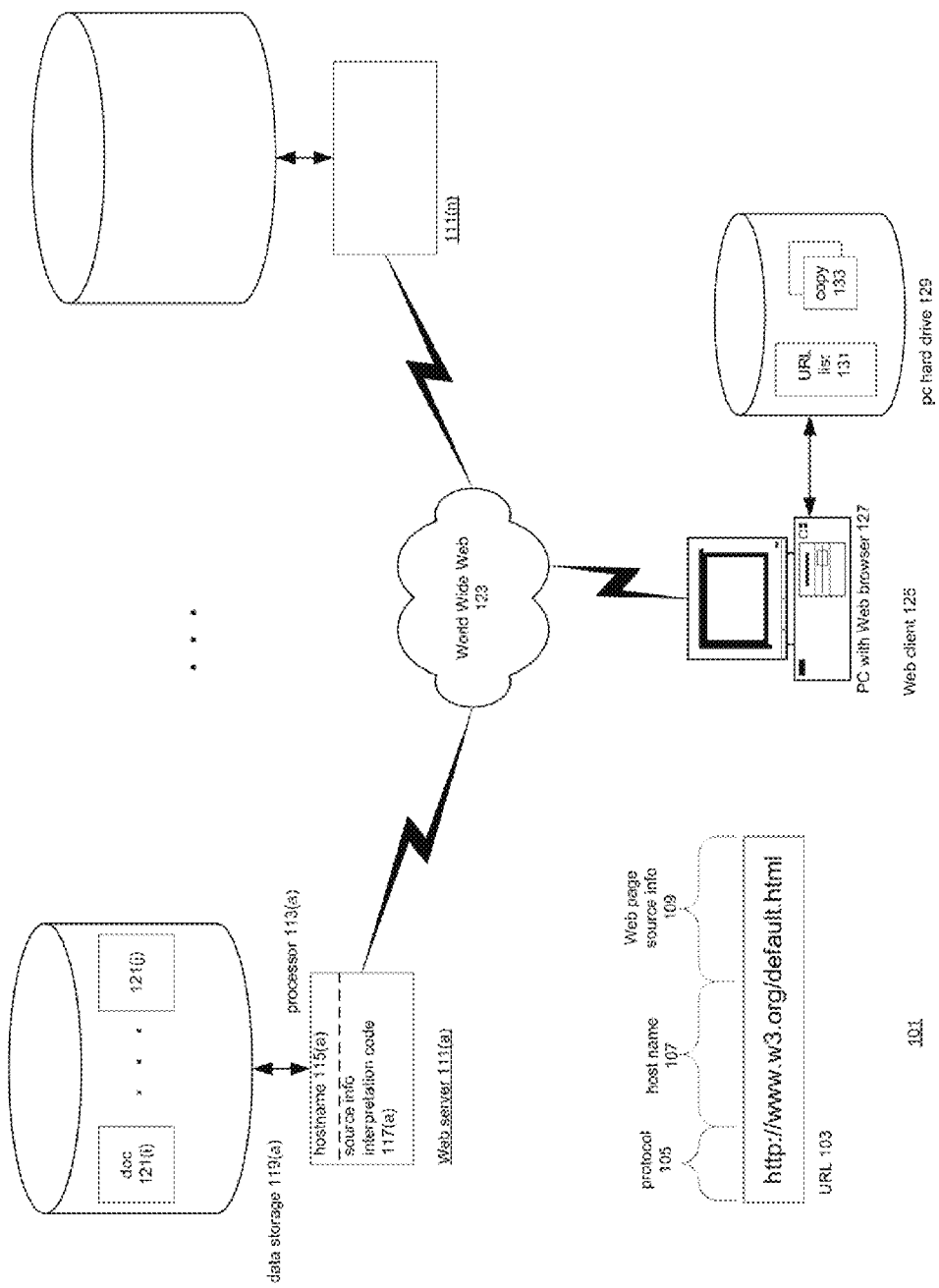
FIG. 1 shows a prior-art system for accessing information via the Internet.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

The following Detailed Description will first present an overview of the web server for multi-version documents, will then describe the user interface, and will finally present details of various components of the web server.

Figure 2:
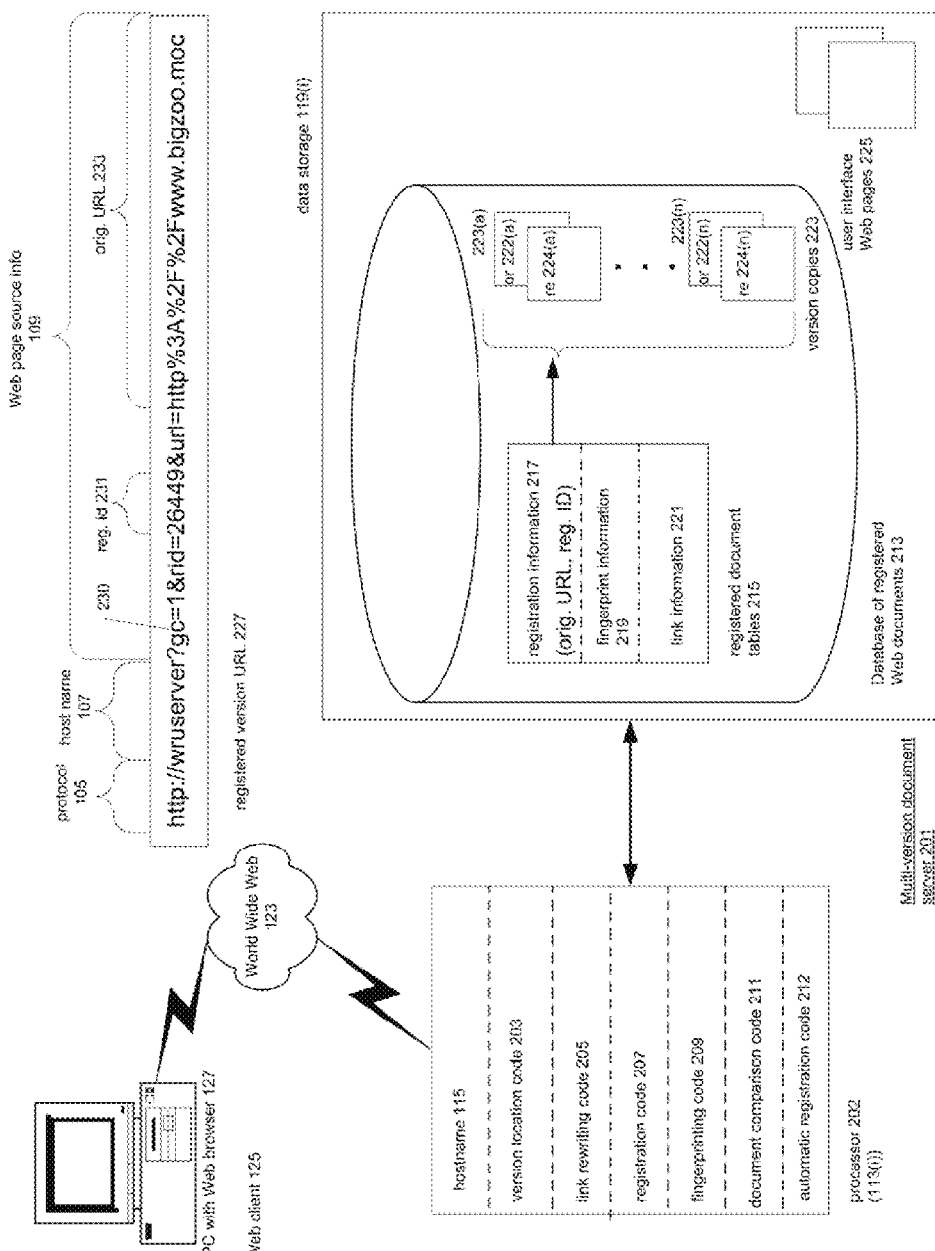
FIG. 2 is a block diagram of the Web server of the invention.

Overview of the Web Server for Multi-Version Documents: FIG. 2

FIG. 2 is a block diagram of a Web server 201 for multi-version Web documents. In some of the following, server 201 is termed a repository server. From the point of view of a Web client 125, Web server 201 is a standard Web server 111. When client 125 places a URL specifying Web server 201 on Web 123, Web 123 delivers the URL to server 201 and server 201 responds to the URL by returning a Web page to client 125. Like any other Web server, server 201 has two main components, a processor 202 which executes code in response to URLs specifying server 201's hostname 115, and storage for the Web pages specified by the URLs or for the information required to make the Web pages. Here, storage 119 includes web pages 225 for the user interface which Web client 125 uses to control document server 201 and a database of registered Web documents 213. A registered Web document is a Web document that has been registered in server 201, that is, server 201 has made a copy 223 of the Web document as it was when it was registered in database 213 and has made a registered version URL 227 to which multi-version document server 201 can respond by providing the version copy 223 referred to by registered version URL 227 to the Web client 125 that was the source of the registered version URL. In the preferred embodiment, copy 223 has two parts: an original copy 222, which is the copy exactly as it was received upon registration, and a rewritten copy 224, in which links have been rewritten. Why rewriting links is necessary and how it is done will be discussed in detail later.

Fetching a Web Page with a Registered Version URL 227

Registered version URL 227 is a standard URL: it specifies a protocol 105, a host name 107, here, the host name of server 201, and Web page source info 109. The Web page source info in registered version URL 227 includes a parameter list which specifies a program 230 that is to be executed in processor 202 to provide the Web page and data to be used in the execution of the program. Here the program is gc, which fetches the content of a registered Web page. gc is one of the programs in version location code 203 executed by processor 202. When executing version location code 203, server 201 is an embodiment of what is later termed a registered document provider. gc takes two parameters: a registration identifier 231 which uniquely identifies the copy 223 of the registered Web page in database 213 and the original URL 233 of the fetched page. In a preferred embodiment, when multi-version document server 201 receives registered version URL 227, it executes the gc program. gc first attempts to establish a connection between server 201 and the server 111(i) specified by original URL 233; if that succeeds, gc redirects Web client to fetch the Web page using original URL 233. If the attempt to establish a connection fails, gc uses registration ID 231 to locate copy 223 in database 213 and that copy is returned to Web client 125. When used as just described, multi-version document server 201 guarantees that when Web client 125 provides a registered version URL 227 to server 201, client 125 will receive the copy 223 of the Web page specified by registration identifier 231 even when the document specified by original URL 233 is unavailable.

The information that version location code 203 needs to interpret registered version URL 227 is contained in registration information 217 in registered document tables 215. Registration information 217 relates copy 223 to the original URL used to fetch the Web page from which copy 223 was made and to the registration identifier which uniquely identifies that copy 223. Because the registration identifier uniquely identifies copy 223, database 213 can contain different versions of the Web document identified by the original URL. Further, because the registration identifier is included in the registered version URL 227, registered version URLs are unique for each version and can be used by client 125 to fetch particular version copies 223 from server 201. In a preferred embodiment, this is done by inputting registration ID 231 from URL, 227 into the user interface provided by server 201; in other versions, it may be done by providing URL 227 to the user interface and then specifying whether server 201 is to return the version currently specified by original URL 233 or the copy specified by registration identifier 231. As will be explained in more detail later, for a given copy 223(i), the user may also specify whether he or she wants original copy 222(i) or rewritten copy 224(i).

Registering a Web Page in Server 201

A user of a Web client registers a Web page in server 201 by inputting the URL of the Web page to be registered to a Web page of user interface web pages 225. In response to the input from that Web page, server 201 executes registration code 207 which fetches the document currently specified by the URL, generates a registration ID for it, creates an entry in registration information 217 for the registration ID which contains the original URL, the registration ID, and the location of a copy of the document in database 213, and then creates a URL 227 for copy 223 and returns it to the user, who can then use it as described above. When executing registration code 207, server 201 is an embodiment of what is later termed a document registrar.

Automated Registration of Web Pages

A preferred embodiment of server 201 will do automated registration of Web pages. In the preferred embodiment, an administrator of server 201 may specify a range of IP addresses of interest. Server 201 will execute automatic registration code 212 which fetches Web contents at those addresses and registers them as described above in server 201. Variations on automatic registration include:

1. Automatic registration of links: Starting from a registered URL, parse all the reference links in the document identified by the URL, and register those URL links automatically. The system can provide the option to limit registration of URLs only to those that come from the same website (domain).
2. Recursive automatic registration of links: Starting from a registered URL, recursively follow all of the URLs links in the document identified by the URL as long as they come from the same website (domain). Note that this option will be time-consuming for certain websites.
3. Automatic scheduled registration: setting up a schedule to register certain URLs of which content versions and changes are both frequent/periodic and important. For example, an URL pointing to an internal daily TODO list can be auto-registered using a daily schedule.

Of course, automatic registration of links and recursive automatic registration of links may be combined with other forms of automatic registration. Other embodiments of the invention may also provide a user interface which permits a user of server 201 to set up automatic registration of URLs that are of personal interest to the user from Web client 125. By using the document fingerprinting and fingerprint comparison techniques described below, server 201 in another embodiment can limit automatic registration of documents to those which are substantially different from already registered documents.

Using Server 201 to Produce a Version History of Copies 223

Registration information 217 can also be used to provide a version history of the version copies 223 that were fetched using a particular original URL. Because registration information relates the original URL to the registration ID, processor 202 can query registration information 217 using a registration ID and receive a list of the registration identifiers for copies 223 of versions of the document that have the same original URL as the URL in for the copy 223 identified by the registration ID. Server 201 uses the registration IDs and the original URL to construct a list of URLs 227 for the copies 223 specified by the registration IDs. The list is returned as links in a Web page to Web client 125 and the user can click on a link to select a specific version. When server 210 receives the URL 227 corresponding to the selected link, it uses the URL to return the copy 223 specified by the URL 227 to Web client 125. In other embodiments, server 201 may provide a version history in response to the input of an original URL or of a registered version URL 227. In the former case, the original URL would be used to make the query; in the latter case, original URL 233 from the registered version URL 227 would be used to make the query.

URL Search

A server 201 may have many thousands of registered documents, each with its own copy 223 and registered version URL 227. In many embodiments, it will therefore be useful to provide a URL search capability. In URL search, the user at Web client 125 inputs a search string to a Web page 225 provided by server 201 and server 201 searches registration information 217 for original URLs which contain the search string input by the user. Wildcard characters may of course be used in the search strings. Server 201 can also offer case sensitive and insensitive search and sorting based on URLs or registration time. As output from the URL search operation, server 201 returns a Web page with a list of links containing matching URLs 227 and for each matching URL, its registration ID 231 and registration time.

It should be pointed out here that while server 201 registers URLs, the techniques just described can be used with any kind of locator or identifier that can be used to fetch a data item. For this reason, the generic term document locator is sometimes used in the following as a generic term for a URL of any other kind of locator or identifier that can be used to fetch a data item. What is required for registration is the following:

Data structures available to server 201 that relate three things to each other:
a copy of the data item being registered that is accessible to server 201;
the document locator used to fetch the original of the data item at the time of registration; and
a registration identifier for the copy that uniquely identifies the copy that is accessible to server 201.
A document locator for the copy to which server 201 responds by fetching the copy.

Operations Performed on Copies 223

Many operations can be performed on version copies 223 that further increase the usefulness of server 201. Among these are relative link rewriting, fingerprinting copies 223, comparing copies 223 on the basis of their fingerprints, and including indexes to the contents of the copies 223 in database 213.

Link Rewriting

Web pages are defined using HTML (hypertext markup language). In HTML, a link to another Web page can be written either as an absolute link, which specifies a complete URL, including protocol 105, hostname 107, and Web page source info 109, or a relative link, which consists of Web page source info 109 which is appended to the URL used by the user to fetch the Web page that contains the relative link. Because the URL formed using the relative link always has the protocol and host name from the URL used to fetch the Web page containing the relative link, relative links are used to refer to other Web pages that are contained in the same host as the Web page that contains the relative link.

When a URL is registered in server 201 and a copy of the Web page specified by the URL is added to version copies 223, copy 223 is of course no longer in the Web server for the host for which the original of copy 223 was written and relative links in copy 223 will be completed from the URL used to fetch copy 223, which is a URL that specifies server 201. To deal with this problem, when server 201 fetches the Web page referred to by a URL which is being registered and adds a copy of the Web page to version copies 223, it makes two copies—one of these, original copy 222 is an exact copy of the original as fetched at registration time, the other, rewritten copy 224, is a copy in which all of the relative links in version copy 223 have been rewritten so that when the user clicks on a relative link, server 201 provides an absolute URL that like registered version URL 227 employs the gc program to redirect client 125 to the server 111(*i*) specified by an URL made from the hostname for the host from which the fetched Web page was obtained. The information server 201 needs to do this is obtained from the URL being registered. The preferred embodiment also rewrites the URLs for most absolute links in the same fashion, with the gc program redirecting client 125 to the server 111(*i*) specified in the original absolute link Fingerprinting Version Copies 223

A fingerprint of a document is a value that is much smaller than the document and is produced from the document in such a fashion that the fingerprints of two documents can be compared to determine how similar the documents are to each other. Fingerprints differ from digests of documents produced by hash functions in that a comparison of two digests can only indicate whether the documents from which the digests were produced are identical. Fingerprint comparisons, on the other hand, indicate a degree of similarity of the documents being compared. Document server 201 employs fingerprinting code 209 to make a fingerprint of each registered document when the document is registered and the fingerprints are stored in fingerprint information 219. The fingerprinting algorithm used in a preferred embodiment will be explained in detail later.

Comparing Version Copies 223

Because each version copy 223 in server 201 has a fingerprint, the similarity between any two version copies 223(*i*) and (*j*) can be determined by comparing the fingerprint for version copy 223(*i*) with the fingerprint for version copy 223(*j*). The comparison is done by document comparison code 211. In a preferred embodiment, server 201 maintains for each version copy 223 a list of the results of fingerprint comparisons between the particular version copy 223 and version copies 223 whose original URLs have the same host name 107 as the particular version copy.

When the user of Web client 125 requests a version history for a given version copy 223, server 201 returns not only a list of links for the version copies 223 that have the same original URL 233 as the one associated with the registration ID 231 that the user provides as input to client 125, but also a list of links to version copies 223 that appear on the list of the results of the fingerprint comparisons. Included with the link is a value for the degree of similarity of the version copy specified by the link to the given version copy 223. In other embodiments, a user may be able to obtain a list of similar version copies independently of the version history operation simply by providing a registration ID for a document or selecting a link to the document from a list in a user interface Web page 225. Being able to show the degree of similarity between two version copies 223 has two important advantages:

- when a version history of versions referred to by a given original URL is made, the degree of similarity of the versions permits the user to make some surmises about the relationship between the versions; and
- Where the same or very similar content has been associated with two different original URLs from the same Web site, the degree of similarity between the copies 223 for the different original URLs reveals that the content associated with the original URLs is substantially the same.

Indexing Version Copies 223

The techniques described in U.S. Ser. No. 10/810,756, Hu, et al., A database management system with persistent, user-accessible bitmap values, filed Mar. 26, 2004, may be employed to make bitmap indexes of the contents of version copies 223 in database 213. The indexes could be made for all of the version copies 223 or separate indexes could be made for the version copies 223 associated with a given original URL.

Examples of Ways in Which Server 201 May Be Used

Server 201 has the following characteristics:

- it can provide a version copy 223 of a Web document when the Web site from which the document comes is unavailable.
- Registration makes a version copy 223 of the version of the Web document that is current available at the Web site from which the document comes and relates the copy and the original URL to a version number, so that versions of the Web document can be tracked.
- Registration may be automatic.
- Original URLs of version copies 223 may be searched.
- Version copies 223 are related to fingerprints 819 that permit comparison of the version copies.

Uses of server 201 which take advantage of these characteristics will be explained in the following.

Server 201 as a Robust Source for Shared Information

A business may have an intranet with a number of internal Web sites, including some personal Web pages located on PCs. A Web document on one of these sites is of course available only when the site is operating. A server 201 implemented in a high availability processor and database system can solve this problem. Web documents from the internal Web sites that need to be generally available at all times can be automatically registered in server 201. Workers for the business can use the registered version URL 227 for the document to fetch it. As described above, server 201 will respond to the registered version URL by first attempting to use the document's original URL 233 to redirect Web client 125 to the document's home Web site and if that fails, will provide the version copy 223 referred to by URL 227's registration ID 231. Server 201 used in this fashion may be combined with a search engine that has been modified to search the business's Intranet. When the search engine indexes a Web document, the document is also registered with server 201, and the list of URLs returned by the search engine is a list of URLs 227 for registered copies 223 of the Web documents.

Server 201 as a Source of Versions of a Web Document

Presently, if the business wishes to make historical versions of a Web document available through a single URL, the Web page produced in response to the single URL must be a list of the historical versions, and this list must be updated each time a new version becomes available. With server 201, the business need only register each new version in server 201; to see the available version copies 223 and retrieve any of them, a user need only use the version tracking operation with the registered version URL 227 for one of the versions.

Server 201 as a Storage Place for a Version of a Web Document That a User Wishes to Keep and Make Available to Others Presently, if someone finds a version of a Web document that is currently of interest to himself and others, those interested receive a URL for the Web document that may later not function at all or retrieve a version of the document that is different from the one that is currently of interest. This situation can be avoided by registering the version of the Web document that is of interest and providing its registered version URL 227 to those who are interested in the registered version.

Figure 3:
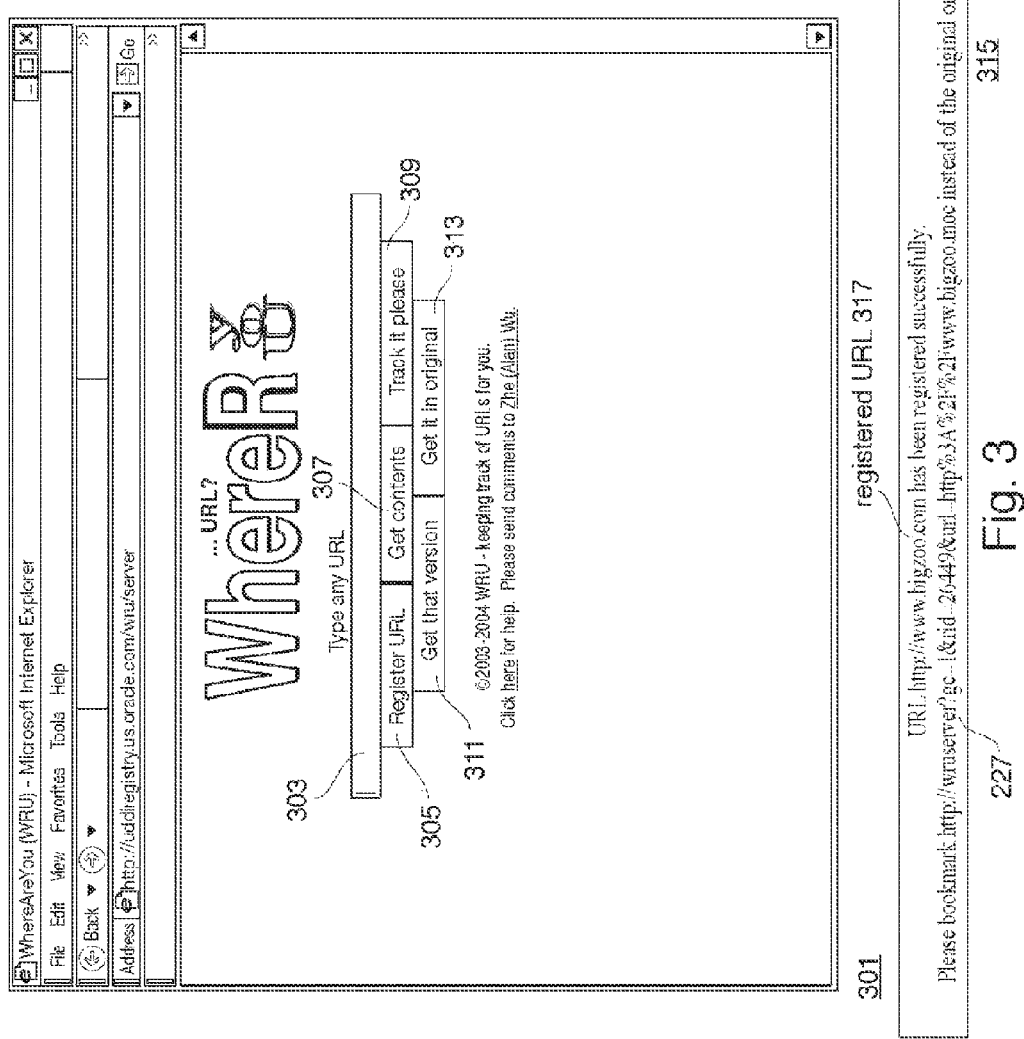
FIG. 3 is the top-level Web page for the server's GUI.
Figure 4:
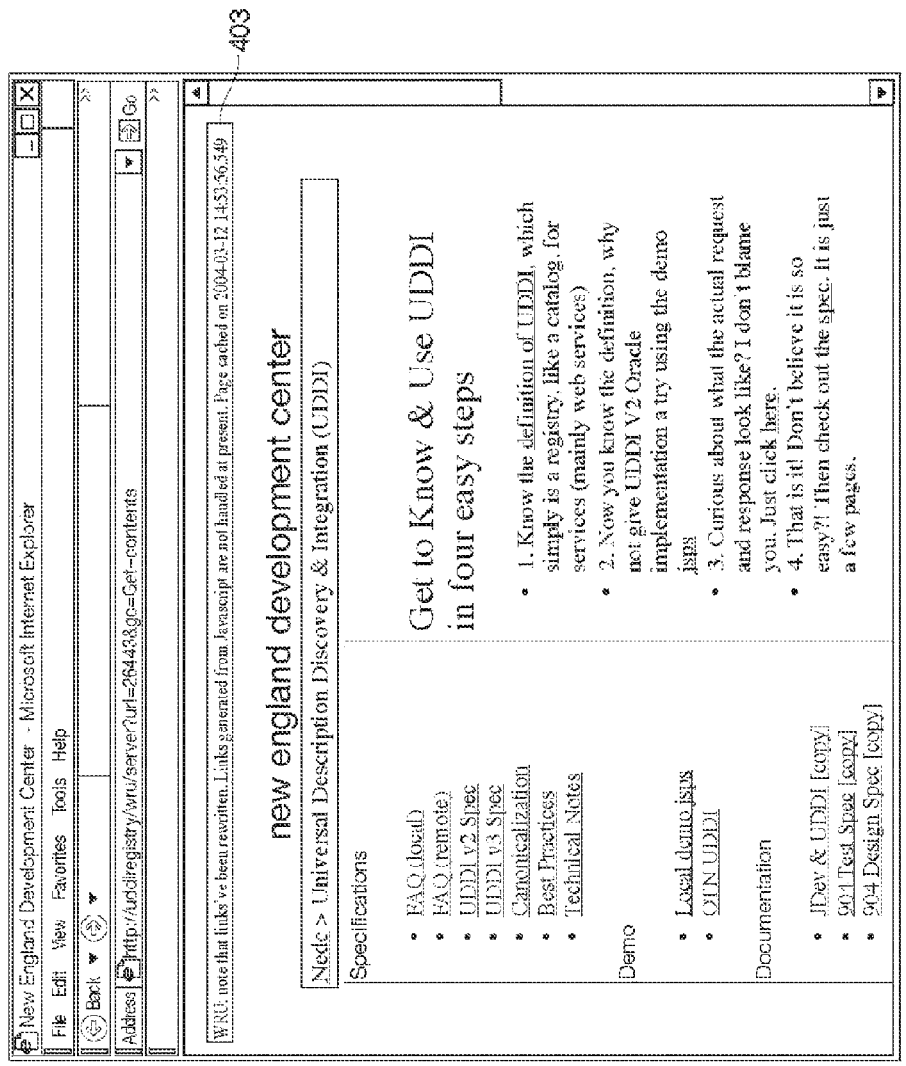
FIG. 4 shows the Web page that appears if the page is not available on the Web.
Figure 5:
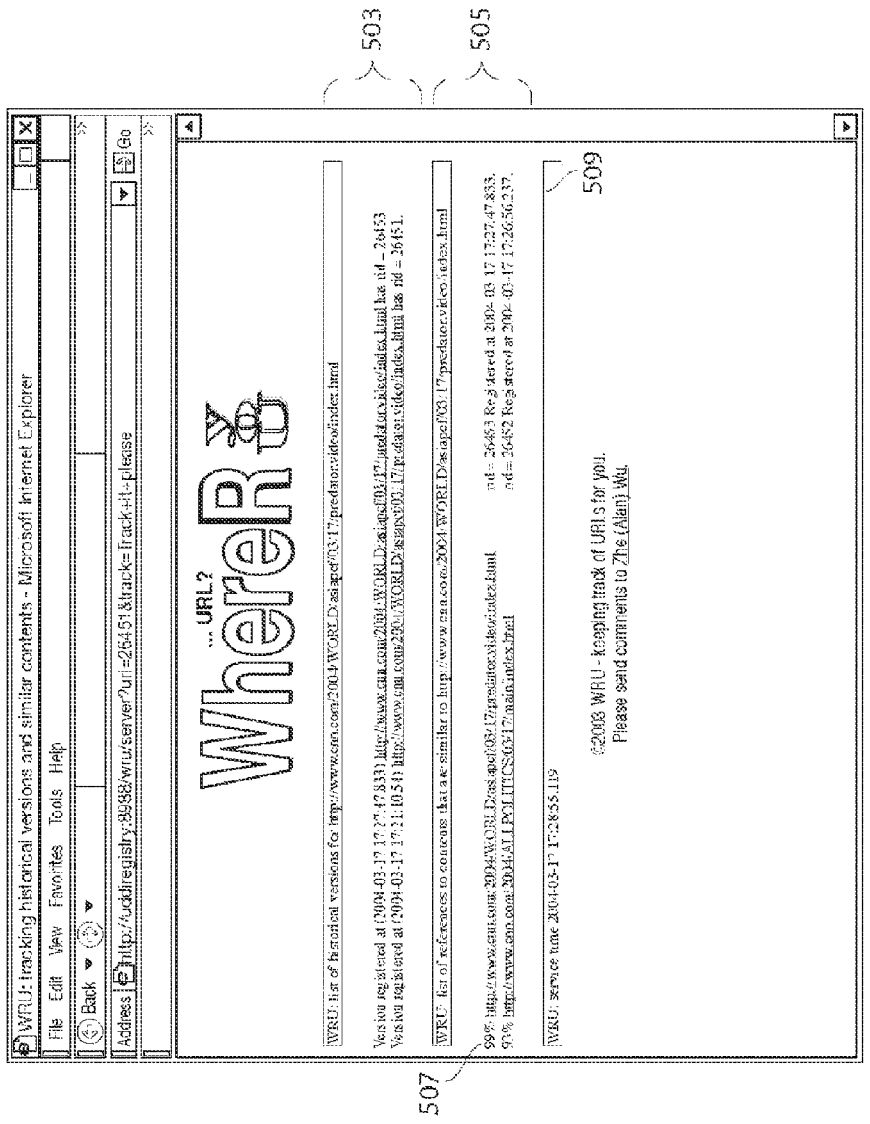
FIG. 5 shows the Web page that appears if the user requests version tracking.

Details of the User Interface in a Preferred Embodiment: FIGS. 3-5

FIG. 3 shows the first user interface Web page 225 which server 201 returns to a user who wishes to use server 201 to register a Web page, fetch the Web page, or track the versions of a particular Web page that are stored in server 201. At 303 is a writable field into which a user may enter a URL to be registered, a registered version URL 227, or a registration ID number 231 to have server 201 fetch the original document or a copy 223 or track the versions of the document in server 201. When the URL or registration ID number has been input, the user clicks on one of the buttons under field 303 to specify the operation. As can be seen from the labels, when the user clicks on button 305, server 201 registers the URL in field 303. Upon registering the URL, server 301 returns a Web page with the contents shown at 315; as seen there, the returned page indicates the URL 317 that has been registered and the registered version URL 227 resulting from the registration. If the URL 317 has already been registered, message 315 so indicates.

When field 303 contains a URL 227 or a registration ID 231, what happens depends on which of buttons 307-313 the user clicks on. Reference numbers in parentheses in the following refer to flowchart portion 1138 in FIG. 11.

If the user clicks on get contents button 307 (1139, 1141, 1143), server 201 attempts to establish a connection to the server 111(*i*) specified by the document's original URL and redirect Web client 125 to that server. If the attempt fails, server 201 fetches the version copy 223 specified by the URL 227 or registration ID 231 and provides it to client 125. The Web page that appears when server 301 is able to redirect client 125 is simply the version that is currently available on server 111(*i*); if the redirection fails and server 301 fetches a version copy 223(*i*), what appears is Web page 401, shown in FIG. 4. Web page 401 is produced from rewritten copy 224 and includes highlighted legend 403 stating that links have been rewritten and indicating the date and time at which copy 223(*i*) was registered.

If the user clicks on Track it please button 309, server 301 produces a Web page 501 (FIG. 5) which contains a list 503 of versions of copy 223 specified by the URL 227 or registration ID 231 and a list 505 of copies 223 that are similar to the copy specified by URL 227. In each list entry, the registration id of the copy 223 and the time the copy 223 was registered is specified; in the list of copies that are similar, each entry further contains a value for the degree of similarity at 507. At 509, finally, the page indicates when the tracking was done. Clicking on a list entry results in the return of the rewritten copy 224 of version copy 223 represented by the entry.

If the user clicks on Get that version button 311 (1139, 1141, 1145, 1147), what is returned is rewritten copy 224 of the version copy 223 specified by the URL 227 or registration ID 231. The display is the same as that shown in FIG. 4.

If the user clicks on Get it in original button 313 (1139, 1141, 1145, 1147), what is returned is original copy 222 of the version copy 223 specified by the URL 227 or registration ID 231.

Many other versions of this interface are of course possible. In some applications, not all of the operations will be required. For example, if server 201 is only intended to make sure that a version of a Web document is always available and documents are registered automatically or only by system managers, only a get contents operation may be needed. Similarly, if the only use of server 201 is to track versions and the versions are registered automatically or only by system managers, only the tracking operation may be needed In many embodiments, only system managers will he interested in original copy 224, so the user will only see rewritten copy 224. In other embodiments, the interface may provide buttons for other operations, for example, a document comparison operation that is independent of the version tracking operation or a URL search operation.

Details of Registered Document Tables 215

Figure 6:
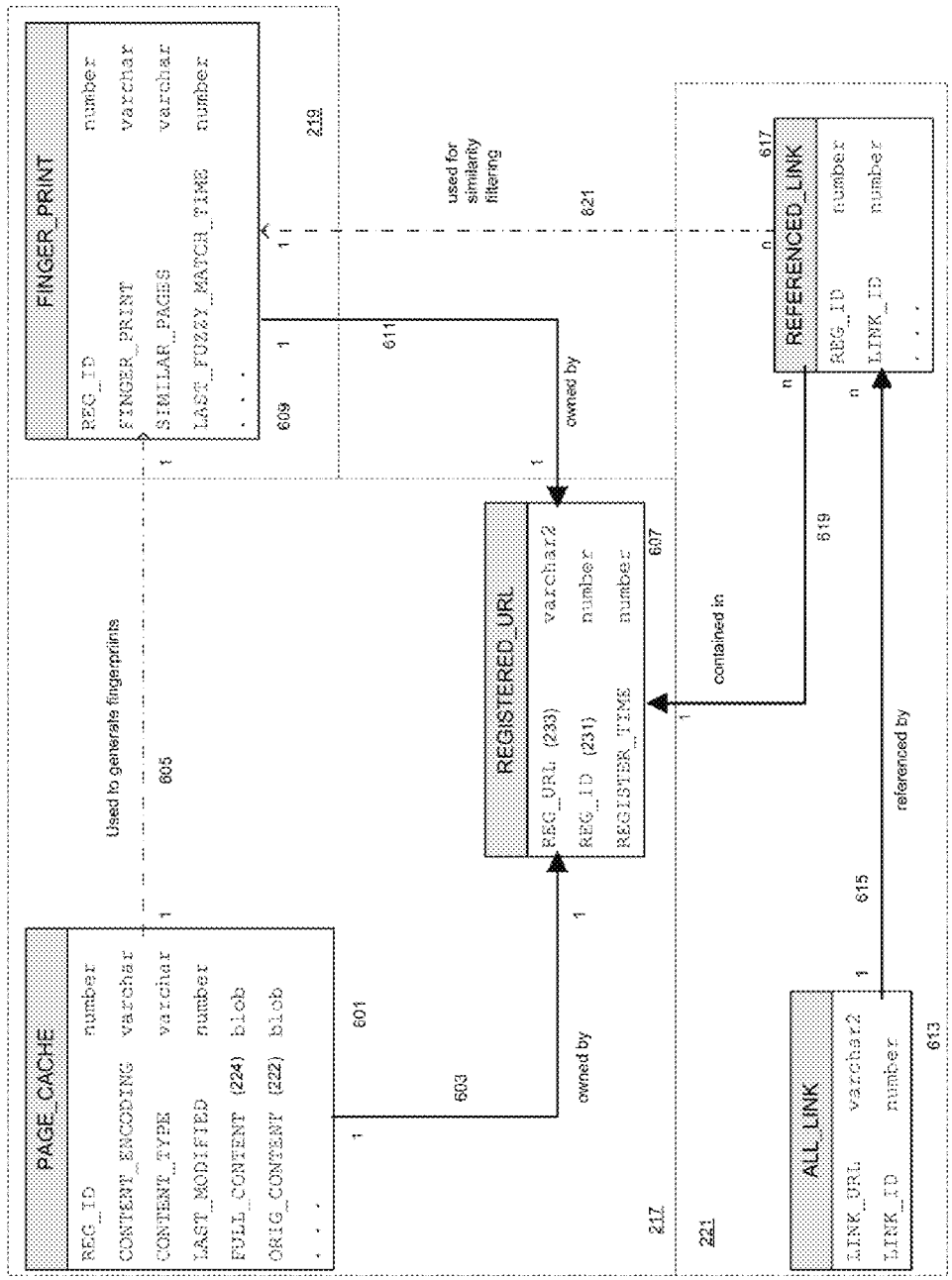
FIG. 6 is an entity-relationship drawing of registered document tables 215.

In a preferred embodiment, the information relating a registration ID 231 to the original URL 233 of a Web page as well as the information required for fingerprinting and document comparison is contained in registered document tables 215 in a relational database system. FIG. 6 is an entity-relationship diagram of tables 215 and the relationships between them. Dotted-line boxes in FIG. 6 indicate the relationship between the tables and the kinds of information shown in FIG. 2.

Beginning with registration information 217, this information is contained in two tables: PAGE_CACHE table 601 and REGISTERED_URL table 607. REGISTERED_URL table 607 relates registration IDs 231 to original URLs 233. There is a row in table 607 for each registered version copy 223. The fields in the row which are relevant to the present discussion are the REG_URL field 233, which contains the original URL 233 for the version copy 223, the REG_ID field, which contains the registration ID 231 for the version copy 223 and is the unique key for the row, and the REGISTER_TIME field, which contains a date stamp indicating the date and time at which version copy 223 was registered.

PAGE_CACHE table 601 relates registration IDs 231 to version copies 223. There is a row in table 601 for each registered version copy 223, and thus a row in table 601 for each row in REGISTERED_URL table 607. The fields in the row that are relevant to the present context are the REG_ID field, which contains the registration ID 231 for the version copy and is the unique key for the row, CONTENT_ENCODING, CONTENT_TYPE, and LAST_MODIFIED, which all contain information about the version copy 223, and the two versions of version copy 223: rewritten version 224 in the FULL_CONTENT field and original version 222 in the ORIG_CONTENT field. The occurrence of REG_ID in both the PAGE_CACHE and REGISTERED_URL tables further relates original URLs to version copies 223.

Fingerprint information 219 is contained in FINGER_PRINT table 609. There is a row in table 609 for each registration ID 231, and consequently for each version copy 223. The relevant fields in the row are the REG_ID field, which contains the registration ID 231 for the version copy 233 and is the unique key for the row, the FINGER_PRINT field, which contains the fingerprint made from original version 222 of the version copy, and the SIMILAR_PAGES field, which contains a list of version copies 223 that come from the same Web site as the version copy 223 identified by the value of the REG_ID field and have a substantial similarity to the version copy identified by the value of the REG_ID field. The list includes for each version copy the version copy's registration ID and a value indicating the degree of similarity between that version copy and the version copy identified by the value of the row's REG_ID field. The LAST_FUZZY_MATCH_TIME field contains a time-date stamp that indicates the last time that the list in the SIMILAR_PAGES field was updated.

Link information 221 is contained in REFERENCED_LINK table 617 and ALL_LINK table 613. Each different link that is found in version copies 223 is identified by a unique link ID value. There is a row for each of the links in ALL_LINK table 613. The row for a link relates the link ID (in the LINK_ID field) to an absolute URL that corresponds to the URL specified by the absolute or relative link in the original Web page (in the LINK_URL field). The value of the LINK_ID field is the unique key for the row. REFERENCED_LINK table 617 relates registration IDs to the link IDs for the links in the version copy 223 specified by the registration ID. For each registration ID, there is a row for each link in the version copy 223 specified by the registration ID. The REG_ID field contains the registration ID 231 for the version copy and the LINK ID field contains the link ID for one of the links in the REG_ID field. A query on REFERENCED_LINK table 617 by a registration ID will return a list of the link IDs for the links in the version copy 223 identified by the registration ID, and the link IDs can then be used in the ALL_LINK table to obtain the URLs for the links. In a preferred embodiment, link information 221 is used to make a threshold determination of whether two version copies 233 are similar enough to warrant comparing their fingerprints.

Details of the Operations of Web Server 201.

Figure 11:
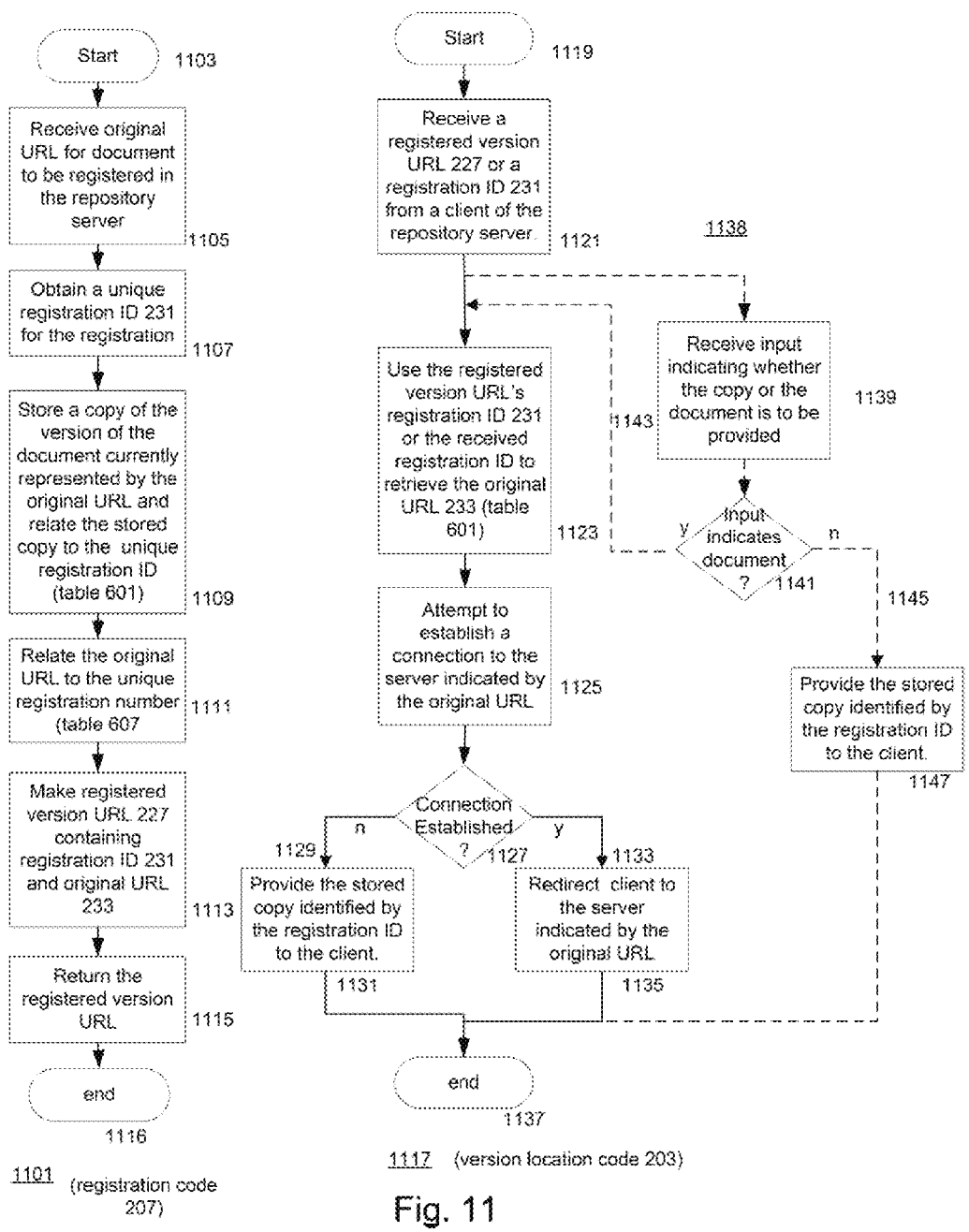
FIG. 11 shows flowcharts of the operation of registration code 207 and version locator code 203.

When the tables of FIG. 6 are studied in conjunction with the graphical user interface of FIGS. 3-5 and the flowcharts of FIG. 11, it is immediately apparent how the operations of registering a URL, getting the contents of a registered URL, tracking versions, getting the rewritten version 224 of a copy 223, and getting the original version 222 of the copy 223 are performed. Numbers in parentheses in the following are from the flowchart of FIG. 11.

Registration: (1101)

When an original URL is entered in field 303 of entry user interface page 301 (1105) and the user clicks on Register URL button 305, registration code 207 obtains a unique registration ID 231 for the registration (1107), makes a row in PAGE_CACHE table 601 in which the REG_ID field's value is registration ID 231, and then saves a copy 222 of the content referred to by the original URL in the row's ORIG_CONTENT field (1109). Registration code 207 further provides the relevant values from copy 222 for the CONTENT_ENCODING and CONTENT_TYPE fields and uses link rewriting code 205 to rewrite the links in copy 222 to produce copy 224, which is stored in the row's FULL_CONTENT field. Link rewriting code 205 also makes rows for the links as needed in ALL_LINK table 613 and REFERENCED_LINK table 617. Then the registration code makes a new row for the new registration identifier and the original URL in REGISTERED_URL table 607 (1111) and time stamps the new entry. Then a the registered version URL 227 for the registered version of the document is created (1113) and is returned (1115). Depending on the embodiment, registration code 207 may invoke fingerprinting code 209 fingerprinting of original version 222 of the new version copy 223 at registration time or fingerprinting may be done later. When it is done, a row is made in FINGER_PRINT table 609 for the new version copy 223 and the fingerprint. Since comparison of the fingerprint for the new version copy 223 with the fingerprints for all of the other version copies 223 from the same Web site requires considerable resources, making the list in SIMILAR_PAGES will typically be done later. Automatic registration works substantially as just described, except that the original URLs are provided by the Web crawler.

Getting Contents (1117)

When a user inputs a registered version URL 227 or a registration ID 231 to field 303 and clicks on Get contents button 307 (1121), server 201 executes version location code 203. The input registration ID 231 or the registration ID 231 from the input registered version URL 227 is used to locate the row for the registration ID 231 in REGISTERED_URL table 607 (1123) and server 201 uses the original URL 233 in the REG_URL field to try to establish a connection with the server specified by original URL 233 (1125). If server 201 succeeds (1127, branch 1133), it redirects Web client 125 to that server (1135); otherwise (1127, branch 1129), server 201 fetches rewritten copy 224 of the version copy identified by the registration ID from the registration ID's row in PAGE_CACHE 601 (1131). The date-time output in indication 403 that accompanies rewritten copy 224 is obtained from the REGISTER_TIME field in the registration ID's row in REGISTERED_URL table 607.

Tracking Registered Versions of a Web Document Having a Particular Original URL

When a user inputs a registered version URL 227 or a registration ID 231 to field 303 and clicks on Track it please button 309, server 201 also executes code that is part of version location code 203. Execution of this code causes server 201 to use the original URL associated with the registration ID in registered version URL 227 or in REGISTERED_URL table 607 to locate all of the rows in REGISTERED_URL table 607 whose REG_URL field 233 has a value which is the same as that of the original URL. These rows of course correspond to the versions of Web documents stored in server 201 that correspond to the original URL. The code then causes server 201 to use these rows to produce a registered version URL 227 for each of the rows and to use the registered version URLs 227 to produce list of versions 503 in Web page 501.

Trucking Registered Versions of Web Documents That are Similar to a Given Registered Version In a preferred embodiment, Web page 501 also includes list 505 of registered Web documents 223 that are similar to the registered Web document 223 specified by registered version URL 227 or registration ID 231. In a preferred embodiment, version location code 203 causes server 201 to make list 505 from the list of registration IDs and similarity values in the field SIMILAR_PAGES in the row for the registration ID 231 in the table FINGER_PRINT 609.

Retrieving a Particular Version Copy 223 of a Web Document

When a user inputs a registered version URL 227 or a registration ID 231 to field 303 and clicks on Get that version button 311, version location code 203 causes server 201 to retrieve rewritten copy 224 from the field FULL_CONTENT in the row of PAGE_CACHE table 601 specified by the input registration ID 231 or the registration ID 231 from the input URL 227. When the user does the same and clicks on Get it in original button 313, version location code 203 causes server 201 to retrieve original copy 222 from the field ORIG_CONTENT in that row.

Details of Link Rewriting

As described above, when server 201 registers a Web document, server 201 rewrites the relative links in the Web document to produce rewritten copy 224 of the Web document. The code that server 201 executes to do the rewriting is link rewriting code 205, which employs the following method to rewrite each URL that it encounters in the Web document being registered:

URL rewriteUrl(URL baseURL, URL url).
{
1. First, construct an absoluteURL based on baseURL and url. Note that if url is not a relative URL, then absoluteURL will be equal to url.
2. Second, if the url is from HTML form action, for example <form action=" . . . ">, then return absoluteURL.
3. Otherwise, construct a special form of registered version URL including the original URL but not the registration ID and return it. Note that what is constructed here is a special form of registered version URL 227 that includes original URL 233 but does not include registration ID 231.
}

Server 201 then writes this special form of URL 227 into rewritten copy 224 in place of the URL in the original link. When a user is viewing rewritten copy 224 and clicks on a link with a rewritten URL, server 201 receives the special form of registered version URL 227 and responds as described above for the standard registered version URL 227: it redirects Web client 125 to the Web document specified by the absolute URL contained in the special URL 227. In other embodiments, if that Web document is unavailable and there is a stored copy corresponding to the URL in server 201, server 201 may fetch the copy, and may in some cases fetch the copy whose registration date makes it most relevant to the copy that contains the link. Indeed, in some embodiments, server 201 may first attempt to fetch a relevant stored copy instead of fetching the current version. URLs in the HTML form action construct <form action="url"> are not rewritten using the special form of URL 227 because they are usually entry points to some processing logic that is available only in the Web server that was the source of the original document. An example is <form action="login.jsp">. To deal with this, the URLs in HTML form action are simply rewritten as absolute URLs for the source server.

Rewriting code 205 further causes server 201 to add a row to ALL_LINK table 613 whenever it encounters or makes an absolute URL that is not already in table 613 and to add a row in REFERENCED_LINK table 617 for version copy 223 to which rewritten copy 224 belongs whenever it encounters or makes an absolute URL for which there is not a row in table 617 for version copy 223's registration ID and the absolute URL's link ID in ALL_LINK table 613.

Details of Fingerprinting

Overview

The whole flow for finding registered URLs for similar version copies 223 is as follows:

Generate a fingerprint using the algorithm explained below for the copy 223 represented by a given registered version URL 227.

Place rows for the absolute links produced by the link rewriting done to produce rewritten version 224 as required in ALL_LINK table 613 and REFERENCED_LINK table 617.

Given an original URL 233 for a given copy 223, get a list of the registration IDs 231 and fingerprints for all other copies 223 whose original URLs 233 have the same host name 107 and port as the host name and port for the given copy's original URL.

Filter the list using formal criteria to quickly eliminate copies 223 which have no meaningful similarity to the given copy 223. In the preferred embodiment, this is done using information in REFERENCED_LINK table 617.

For the copies 223 that pass the filtering, apply the fuzzy matching algorithm defined below to the fingerprints.

Make a list of the registration IDs 231 and degrees of similarity for the copies 223 that bear a reasonable degree of similarity to the given copy 223.

Figure 7:
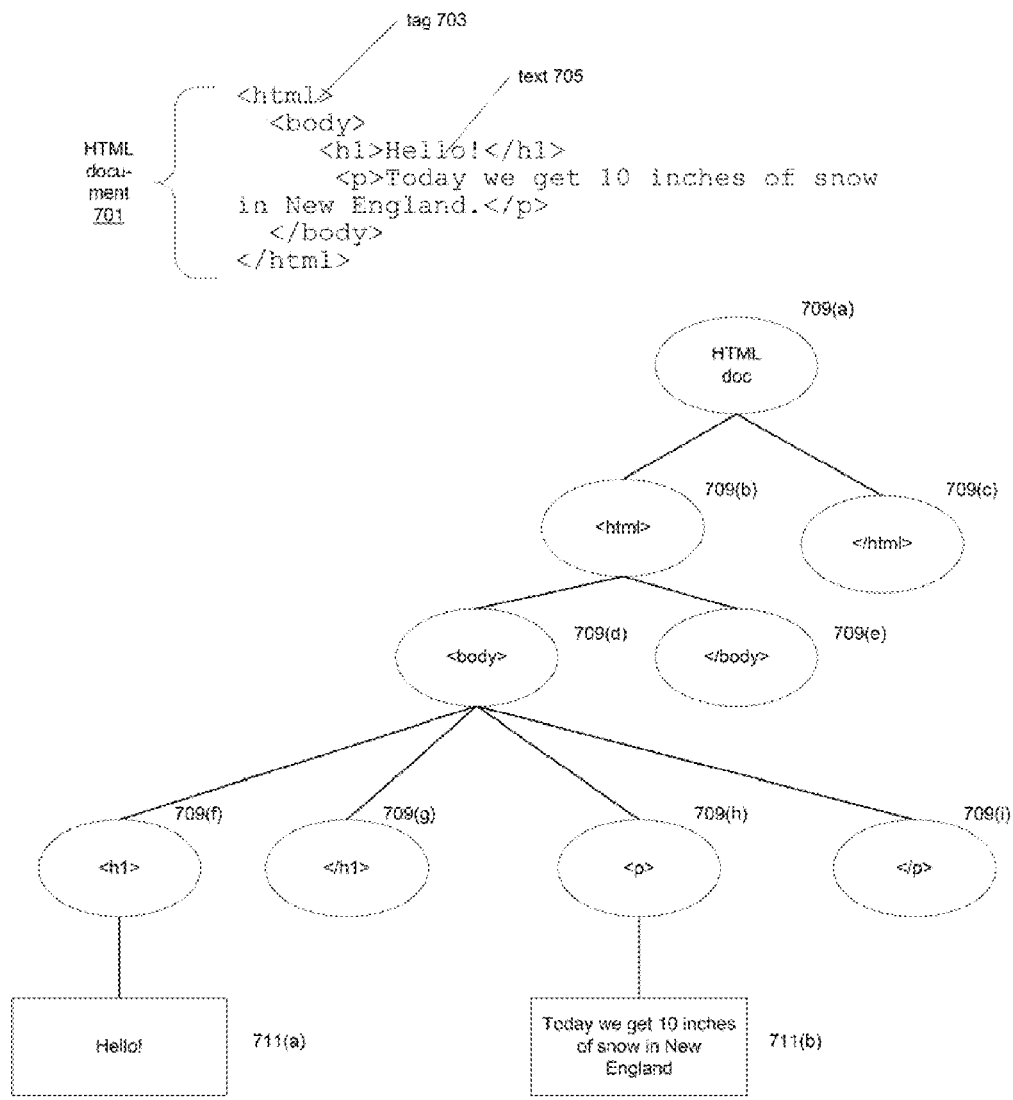
FIG. 7 shows an HTML document and a tree made from the document.

The Fingerprinting Algorithm: FIGS. 7 and 8

This section describes the technique used in a preferred embodiment to produce a fingerprint from an HTML document that can be compared with another fingerprint produced using the same technique to determine a degree of similarity between the HTML documents for which the fingerprints were made. The fingerprints can be compared to determine a degree of similarity because they contain reduced-size representations of all of the structural information contained in the HTML document along with reduced-size representations of the content of the HTML document. The technique described here for fingerprinting HTML documents can be adapted for use in any document representation in which the representation clearly separates the structural information about the document from the document's content.

As shown at 707 in FIG. 7, a HTML document can be viewed as a tree. In the tree, there are two kinds of nodes: nodes 709 representing the structural information in the HTML document and nodes 711 containing the actual content of the HTML document. The content nodes 711 generally contain text. The tree shown at 701 is made from the simple HTML document shown at 701. As shown there at 703, the structural information is provided by HTML tags. Each tag is enclosed in angle brackets, while content is not, as shown at 705. Tags generally come in pairs, for example, <html>, </html>, with the first tag of the pair indicating the beginning of the portion of the HTML document to which the tag applies and the second tag indicating the end. A pair of tags may have other tags or pairs of tags nested in it. In tree 707, each tag node 709 contains the corresponding tag from document 701 and each text node 711 contains the corresponding text.

If fingerprints are to be useful for determining the similarity of HTML documents, a fingerprint must capture the structure of the document as defined by its HTML tags as well as its text or other content but must also be substantially smaller than the HTML document they are made from. In the technique used in the preferred embodiment, the size of the tags is reduced by encoding them and replacing the tags in the HTML document with their encoded versions. To reduce the size of the content in the fingerprint while retaining comparability of the content, several techniques are available:

1. Use a message digest algorithm like MD5 that generates a message digest of a fixed size from a message;
2. Hash the content using a standard hashing technique like the Secure Hash Standard;
3. Replace the text with a part thereof and perhaps also the length of the total text.

The first two techniques are well known. For details on MD5, see RFC 1321 on the website of Internet FAQ Archives; for details on the Secure Hash Standard, see the SHA-1 algorithm FIPS 180-1 on the website of National Institute of Standards and Technology of U.S. Department of Commerce. The preferred embodiment employs the third choice. For example, we can choose to use the first (or middle, or last) word plus the text length. We may also use the first (or middle, or last) non-blank character plus the text length. The third choice produces shorter representations of the text than the first two choices and requires less computation; its disadvantage is that it is less likely to detect changes in the text than the techniques that employ hash codes or digests.

In the preferred embodiment, the text is replaced by a characterization of the text made up of the text's first two non-blank lower case characters plus the text length info. Other embodiments may choose other characters, with the choice typically depending on the language. The length info is modularized by 58 and 64 is then added to the results of the modularization. The modularization and the addition of 64 serve to make the length information representable by human-readable ASCII characters. Note that 64 is the ASCII code for '@' and 121 is the ASCII code for 'y.' These two numbers, 64 and 58, are chosen heuristically and should be tunable system parameters. Other embodiments may use MD5 or some other hash standard for making the characterization of the text.

FIG. 8 shows the algorithm 805 and the fingerprint 819 resulting from the application of the algorithm to HTML document 701. At 801 are shown the encodings of the HTML tags that are employed in document 701. Each row of table 801 has the encodings for a start tag and its corresponding end tag. Thus, row 803 gives the encodings for <HTML> and </HTML>.

At 805 is shown the pseudocode for the fingerprinting algorithm employed in the preferred embodiment. At the top level, the algorithm has three parts: initialization 807, fingerprint production loop 809, and the return of the fingerprint at 817. Initialization 807 initializes the fingerprint variable to a null string. Loop 809 runs until the whole HTML document has been read and processed. There are three different kinds of nodes in tree 707: those for HTML start tags, those for HTML end tags, and those that contain content. IF statement 811 handles HTML start tags: it simply finds the encoded form corresponding to the start tag and places the encoded form in the fingerprint; IF statement 813 does the same with HTML end tags. Content nodes 711 are handled by IF statement 815, which works as described above to add the first two non-blank lower-case characters of the text and then a third character whose value is determined by the length of the text to the fingerprint.

Fingerprint 819 in FIG. 8 has been generated using the above algorithm from HTML document 701. The encoded <HTML> start tag is shown at 821, the encoded <HTML> end tag is shown at 825, and the string used to characterize the text Hello! is shown at 823. In terms of the tree of FIG. 707, the algorithm produces fingerprint 819 by processing node 709(*b*) and adding the result of the processing to fingerprint 819, and so on for node 709(*d*), node 709(*t*), node 711(*a*), node 709(*g*), node 709(*h*), node 711(*b*), node 709(*i*), node 709(*e*), and node 709(*c*).

Calculating Similarities of HTML Documents Using Fingerprints: FIG. 9

Intuitively, given two character-string fingerprints produced as just described from two HTML documents, the greater the total number of characters in the substrings the fingerprints have in common, the greater the degree of similarity of the HTML documents from which the two fingerprints were produced.

FIG. 9 is pseudocode for an algorithm 901 that is based on the above intuition. The details of the algorithm presented below depend on the representations of the HTML start tags used in the fingerprints, but the algorithm can easily be adapted to fingerprints made from other document representations. The algorithm takes as arguments a pair of fingerprints fp1 and fp2, with fp1 being no longer than fp2. The algorithm starts with the shorter fingerprint, termed the source fingerprint, locates the first '<' which is a delimiter of mapped HTML tags in the source fingerprint, finds the longest common substring that starts from the position located, then moves to the next '<' after the common substring and repeats this process. The algorithm uses two functions that need to be understood: locate_substring( ) and longestSubstr( ).

locate_SubString( ) locates the next matching substring. The function takes three parameters. The first one is the source fingerprint. The second one is the substring that is to be found in the source fingerprint. The third parameter defines the starting position in the source string for the match. For example, locateSubString ("abcabc", "ab", 2) will return 4. If no match is found, locateSubString will return 0.

longestSubStr (fp1, fp2, delimPos) returns the longest possible substring which starts from position delimPos in fp1, and is also a substring in fp2. For example, longestSubStr("xyABCGGD1234", "88890ABCG-GABZGGD1234", 3) will return "ABCGG".

Continuing in more detail, at 903, an initialization step initializes two variables which mark positions in the source string, lastPos, which marks the current position in the source fingerprint from which matching is to begin, and delimPos, which marks the position of a current "<" delimiter character in the source fingerprint. lastPos is initialized to 1 and delimPos to the first "<" in the source fingerprint. The similarity between the fingerprints is initialized to 0. The processing of the two fingerprints is done in do while loop 905, which runs until no further left angle brackets "<" can be found in the source fingerprint. In the loop body, the first thing that is done is to look for the longest substring match between the part of fp1 and beginning at the current "<" character and all of fp2 (906); if the length of the match is greater than or equal to 6 characters, the length of the match is added to the variable similarity. The length of the current match or at least 1 is added to lastPos, and starting at lastPos, the next "<" character is found and loop 905 is repeated. When the loop terminates, the similarity of the documents is computed by dividing the current value of the variable similarity by the length of the source fingerprint.

Note that the number "6" in IF statement 906 is heuristically chosen. It should be part of the tunable system parameters. The purpose of this parameter is to put a lower bound on the size of the common substring found. Intuitively, if only a match of a very short substring is found, for example "<v" which is "<p>" in HTML, the fact that such a match is found says little about the similarity of the HTML documents from which the fingerprints were made. As a possible improvement to the above algorithm, once a common substring has been located, it can be removed from fp2 so that that part of fp2 will not be further tested for matches. This is a bit more time consuming though.

Limiting the Number of Fingerprint Comparisons to be Made: FIG. 10

Since there is a fingerprint for every version copy 223 in server 201, the fingerprint 819 for any version copy can be compared with that for any other version copy 223. In most cases, of course, the comparison will show no similarity; finding that out from the fingerprints, however, requires the performance of algorithm 901, whose time of execution is slower for dissimilar fingerprints than for similar ones. What is needed here is a way of filtering document pairs prior to making a fingerprint comparison so that the fingerprint comparison is made only with documents that have a reasonable likelihood of being similar.

In a preferred embodiment, two separate techniques are used to filter document pairs. One technique is used in making the SIMILAR_PAGES list in a given page's row in FINGER_PRINT table 609. The pages on the list are limited to pages from the same Web site as the given page. Another technique is to check for dissimilarity of the links contained in the version copies 223 that are to be compared for similarity. This technique is based on the following observations:

Similar HTML documents tend to have similar numbers of links and the links tend to point to the same Web sites in both documents.

The links in an HTML document change at a rate which is much slower than the rate at which the HTML document's content or tags change.

From the foregoing, if it can be determined for a pair of version copies 223 that are being compared by document server 201 either that the two documents in the pair have greatly differing numbers of links or that the links do not point to the same Web sites in the two documents of the pair, it is clear that the copies 223 of the pair are not similar, and there is no need to compare their fingerprints. The two filtering techniques can of course be combined. It will of course be immediately apparent that the observations concerning links in HTML documents apply equally to links in any other document representation and that the filtering techniques can be used with any kind of document that contains links.

Server 201 maintains the information about links that it needs to filter on the basis of link dissimilarity in REFERENCED_LINK table 617. All the information that is needed for the filtering operation can be obtained by querying REFERENCED_LINK table 617 with the registration IDs of the copies 223 that are being compared. The query for each copy 223 of the pair determines the number of links in for each version copy 223 in a pair. The query further returns a list of the LINK_ID values for the links in the version copy 223 and these values can be compared. If the same LINK_ID value appears on both lists, both version copies 223 have a link to the same URL.

The algorithm for filtering on the basis of link dissimilarity is shown in FIG. 10. As would be expected from the foregoing discussion, the algorithm is carried out in two steps. The first step 1001 determines how many links each version copy of the pair contains and filters on that basis. linkNum1 contains the number of links in the first copy 223 in the pair and linkNum2 contains the number of links in the second copy 223 in the pair. Two tests 1003 and 1005 are applied and the pair of copies 223 is filtered out unless it passes one of them. Test 1003 simply lets pairs of copies 223 pass where the combined number of links is no greater than 7. Test 1005 divides the difference between the number of links in the two documents by the sum of the number of links +2 in the two documents and lets the pair pass if the result of the division is less than ⅓. Again, the numbers 7, 2 and 0.3333, used are chosen heuristically. They could be part of the system's tunable configuration parameters. The first condition says that if together these two URLs contain just a few reference links, the filter should let it pass. The second condition says that if the numbers of reference links of these two URLs differ within a predefined range, the filter should let it pass.

Second step 1007 determines the number of links that the two pages have in common. totalLinksNum is the number of links in one of the copies 223 of the pair; sameLinksNum is the number of identical URLs for which there are links in both of the copies 223. The condition for passing is shown at 1015. Again, the numbers used in the test are heuristically chosen and should be tunable system configuration parameters. The condition says that if the number of the same links is reasonably large compared to the total number of reference links, the filter should let the pair of copies 223 pass. When a pair of copies passes both test 1001 and test 1007, server 201 will compare the fingerprints for the pair.

Conclusion

The foregoing Detailed Description has described to those skilled in the relevant technologies how to make and use the repository server of the invention and has further described the best mode presently known to the inventor of implementing his repository server. It will be immediately apparent to those skilled in the relevant technologies that many implementations of the invention are possible other than the preferred embodiment described herein. For example, the preferred embodiment operates in the environment provided by the Internet and the http protocol and consequently, many details of the preferred embodiment are determined by that environment. The principles of the invention can, however, be employed in any situation where there is a need to ensure that copies of documents normally accessible via a network are accessible when they are not available via the network or when different versions are needed from those presently accessible via the network.

In the preferred embodiment, the necessary relationships between the copies stored in the repository, the document URLs for the copies, the identifiers that identify the copies in the repository server, the copies and their fingerprints, and a copy and its list of similar copies are maintained using tables in a relational database system. These tables may of course take many forms other than the forms disclosed herein, and beyond that, any arrangement of data structures that permits the necessary relationships to be represented will work as well as the relational tables. A given implementation of the invention may not perform all of the operations performed by the preferred embodiment or may perform operations that the preferred embodiment does not perform. The user interface for the preferred embodiment is of course determined by the requirements of the http protocol, by the operations performed by the preferred embodiment, and by the taste of the inventor, and many other user interfaces are possible.

With the fingerprints, too, many details of the preferred embodiment are a consequence of the fact that the fingerprints are designed to be made from HTML documents, but the techniques described herein for making and comparing fingerprints may be easily adapted to any form of document which has structural components as well as content.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. A method of comparing digital documents, the method comprising:
    filtering documents to reduce a total number of documents for fingerprint comparison at least by:
        performing a comparison of respective total numbers of links respectively included in a pair of documents in the documents and one or more websites pointed to by the respective total numbers of links based in part or in whole upon rates of change comprising a first rate of change and a second rate of change, wherein the first rate of change associated with at least one respective total number of links is slower than the second rate of change associated with contents of at least one document of the pair of documents in the documents, and the comparison is performed without comparing fingerprints of the pair of documents; and
        determining whether or not to compare the fingerprints of the pair of documents based at least in part upon the rates of change and whether a degree of difference in the respective total numbers of links from the comparison falls within a predetermined range; and
    in response to determining that the fingerprints should be compared, generating the fingerprints on determining the fingerprints are not existing, and comparing the fingerprints, at a computing system, to determine a similarity value indicating a degree of similarity of the pair of documents being compared, the similarity value expressing degrees of similarity in addition to whether the pair of documents being compared are identical or not identical.

2. The method set forth in claim 1 wherein:
performing the comparison of the links comprises comparing a number of links in the documents.

3. The method set forth in claim 1 wherein:
performing the comparison of the links comprises comparing destinations of the links in the documents.

4. The method set forth in claim 1 wherein:
the documents comprise digital documents identified by identifiers; and
the method includes relating the fingerprint for a digital document to the digital document's identifier,
the digital documents whose identifiers are known and have fingerprints may be compared without reference to the documents or copies thereof.

5. The method set forth in claim 4 wherein:
the identifiers are document locators used to locate the documents in a network.

6. The method set forth in claim 1 further comprising:
relating a given one of the documents to similarity values for a set of other ones of the documents.

7. The method set forth in claim 6 wherein:
the documents are identified by identifiers; and
in relating the given one of the documents to the similarity values, an identifier for the given one of the documents is related to the identifiers and similarity values for the set of other ones of the documents.

8. The method set forth in claim 7 wherein:
the identifiers are document locators used to locate the documents in a network.

9. The method set forth in claim 1 wherein:
the documents comprise digital documents including both structural information and content information and a fingerprint for a document of the documents comprises:
a structural encoding portion in which a first encoding preserves semantic information about components of the digital document's structural information; and
a content encoding portion in which a second encoding preserves content information about components of the digital document's content.

10. The method set forth in claim 9 wherein:
components of the structural encoding portion and components of the content encoding portion occur in the fingerprint in an order in which the components encoded in the encoding portions occur in the digital document.

11. The method set forth in claim 10 wherein:
in the digital document, the components are nested.

12. The method set forth in claim 10 wherein:
the components of the structural information are HTML tags.

13. The method set forth in claim 9 wherein generating the fingerprint further comprises:
encoding the structural information using a first encoding preserving semantic information about the structural information; and
encoding the content information using a second encoding.

14. The method set forth in claim 13 wherein:
in encoding the structural information, the structural information is encoded in an order in which the structural information occurs in the digital document; and
content information is encoded as it is encountered while encoding the structural information.

15. The method set forth in claim 14 wherein:
the structural information is HTML tags.

16. The method set forth in claim 9 wherein the act of comparing the fingerprints further comprises:
(a). finding an encoding of structural information in a first fingerprint;
(b). finding a second fingerprint substring matching a first fingerprint substring that begins at the found encoding;
(c). adding a length of the found substring to a running length total;
(d). finding another encoding of structural information in the first fingerprint not contained in any found substring and repeating acts (a)-(c) with the other encoding of structural information in the first fingerprint;
(e). repeating acts (a)-(d) until no further encodings of structural information can be found in act (d); and
(f). using a length of one of the fingerprints and the running length total to compute a similarity value.

17. A computer program product embodied on a non-transitory computer readable medium, the non-transitory computer readable medium having stored a sequence of instructions executed by a processor causes the process to perform a set of acts, the set of acts comprising:
filtering documents to reduce a total number of documents for fingerprint comparison at least by:
performing a comparison of respective total numbers of links respectively included in a pair of documents in the documents and one or more websites pointed to by the respective total numbers of links based in part or in whole upon rates of change comprising a first rate of change and a second rate of change, wherein the first rate of change associated with at least one respective total number of links is slower than the second rate of change associated with contents of at least one document of the pair of documents in the documents, and the comparison is performed without comparing fingerprints of the pair of documents; and
determining whether or not to compare the fingerprints of the pair of documents based at least in part upon the rates of change and whether a degree of difference in the respective total numbers of links from the comparison falls within a predetermined range; and
in response to determining that the fingerprints should be compared, generating the fingerprints on determining the fingerprints are not existing, and comparing the fingerprints, at a computing system, to determine a similarity value indicating a degree of similarity of the pair of documents being compared, the similarity value expressing degrees of similarity in addition to whether the pair of documents being compared are identical or not identical.

18. The computer program product set forth in claim 17, wherein:
the documents comprise digital documents including both structural information and content information and a fingerprint for a document of the documents comprises:
a structural encoding portion in which a first encoding preserves semantic information about components of the digital document's structural information; and
a content encoding portion in which a second encoding preserves content information about components of the digital document's content.

19. The computer program product set forth in claim 18, wherein the act of generating the fingerprint further comprises:
encoding the structural information using a first encoding preserving semantic information about the structural information; and
encoding the content information using a second encoding.

20. The computer program product set forth in claim 18, wherein comparing the fingerprints further comprises:
(a). finding an encoding of structural information in a first fingerprint;
(b). finding a second fingerprint substring matching a first fingerprint substring that begins at the found encoding;
(c). adding a length of the found substring to a running length total;
(d). finding another encoding of structural information in the first fingerprint not contained in any found substring and repeating acts (a)-(c) with the other encoding of structural information in the first fingerprint;
(e). repeating acts (a)-(d) until no further encodings of structural information can be found in act (d); and
(f). using a length of one of the fingerprints and the running length total to compute a similarity value.

21. An apparatus for comparing digital documents, the apparatus comprising:

a processor and a memory to store instructions, the instructions is executed by the processor to perform:

filtering documents to reduce a total number of documents for fingerprint comparison at least by:

performing a comparison of respective total numbers of links respectively included in a pair of documents in the documents and one or more websites pointed to by the respective total numbers of links based in part or in whole upon rates of change comprising a first rate of change and a second rate of change, wherein the first rate of change associated with at least one respective total number of links is slower than the second rate of change associated with contents of at least one document of the pair of documents in the documents, and the comparison is performed without comparing fingerprints of the pair of documents; and determining whether or not to compare the fingerprints of the pair of documents based at least in part upon the rates of change and whether a degree of difference in the respective total numbers of links from the comparison falls within a predetermined range; and in response to determining that the fingerprints should be compared, generating the fingerprints on determining the fingerprints are not existing, and comparing the fingerprints, at a computing system, to determine a similarity value indicating a degree of similarity of the pair of documents being compared, the similarity value expressing degrees of similarity in addition to whether the pair of documents being compared are identical or not identical.

22. The apparatus set forth in claim 21 wherein:
the digital documents include both structural information and content information and a fingerprint for a document of the documents comprises:
a structural encoding portion in which a first encoding preserves semantic information about components of the digital document's structural information; and
a content encoding portion in which a second encoding preserves content information about components of the digital document's content.

23. The apparatus set forth in claim 22, wherein the instructions are further executed by the processor to:
encode the structural information using a first encoding preserving semantic information about the structural information; and
encode the content information using a second encoding.

24. The apparatus set forth in claim 22 wherein the instructions are further executed by the processor to:
(a). find an encoding of structural information in a first fingerprint;
(b). find a second fingerprint substring matching a first fingerprint substring that begins at the found encoding;
(c). add a length of the found substring to a running length total;
(d). find another encoding of structural information in the first fingerprint not contained in any found substring and repeating acts (a)-(c) with the other encoding of structural information in the first fingerprint;
(e). repeat acts (a)-(d) until no further encodings of structural information can be found in act (d); and
(f). use a length of one of the fingerprints and the running length total to compute a similarity value.

* * * * *